United States Patent
Hall

(10) Patent No.: US 7,797,744 B2
(45) Date of Patent: *Sep. 14, 2010

(54) METHOD AND DEVICE FOR DETECTING COMPUTER INTRUSION

(75) Inventor: Robert J. Hall, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1479 days.

This patent is subject to a terminal disclaimer.

(21) Appl. No.: 10/463,817

(22) Filed: Jun. 17, 2003

(65) Prior Publication Data

US 2004/0064732 A1 Apr. 1, 2004

Related U.S. Application Data

(63) Continuation-in-part of application No. 10/461,932, filed on Jun. 13, 2003.

(60) Provisional application No. 60/388,619, filed on Jun. 17, 2002.

(51) Int. Cl.
*G06F 11/00* (2006.01)

(52) U.S. Cl. .......................... 726/23; 726/22

(58) Field of Classification Search ......... 713/187–194, 713/150–155; 726/22–25; 709/223–225, 709/217–219, 229; 717/127, 176, 177, 124, 717/126; 705/51, 52

See application file for complete search history.

(56) References Cited

U.S. PATENT DOCUMENTS

| | | | |
|---|---|---|---|
| 5,109,413 A | 4/1992 | Comerford et al. | |
| 5,944,821 A | 8/1999 | Angelo | |
| 5,991,807 A | 11/1999 | Schmidt et al. | |
| 6,049,877 A * | 4/2000 | White | 726/5 |
| 6,070,171 A | 5/2000 | Snyder et al. | |
| 6,094,530 A * | 7/2000 | Brandewie | 717/127 |
| 6,182,142 B1 | 1/2001 | Win et al. | |
| 6,189,032 B1 * | 2/2001 | Susaki et al. | 709/225 |
| 6,192,034 B1 * | 2/2001 | Hsieh et al. | 370/241 |
| 6,219,706 B1 | 4/2001 | Fan et al. | |
| 6,233,576 B1 | 5/2001 | Lewis | |
| 6,233,618 B1 | 5/2001 | Shannon | |
| 6,292,798 B1 | 9/2001 | Dockter et al. | |
| 6,292,904 B1 | 9/2001 | Broomhall et al. | |
| 6,418,472 B1 | 7/2002 | Mi et al. | |
| 6,463,474 B1 | 10/2002 | Fuh et al. | |
| 6,473,786 B1 * | 10/2002 | Scouras et al. | 709/206 |
| 6,473,863 B1 | 10/2002 | Genty et al. | |
| 6,510,523 B1 | 1/2003 | Perlman et al. | |
| 6,519,647 B1 | 2/2003 | Howard et al. | |
| 6,523,067 B2 | 2/2003 | Mi et al. | |
| 6,647,388 B2 * | 11/2003 | Numao et al. | 707/9 |
| 6,725,376 B1 * | 4/2004 | Sasmazel et al. | 726/10 |
| 6,732,089 B1 * | 5/2004 | Sinn | 707/3 |
| 6,842,754 B2 * | 1/2005 | Muntz | 707/10 |
| 6,851,108 B1 * | 2/2005 | Syme et al. | 717/146 |
| 6,965,771 B2 | 11/2005 | Rossi | |
| 6,981,279 B1 | 12/2005 | Arnold et al. | |
| 7,016,898 B1 * | 3/2006 | Forlenza et al. | 707/10 |

(Continued)

*Primary Examiner*—Nirav Patel

(57) ABSTRACT

A method and device for detecting intrusion on a computer system utilizes a target server running software that is executed for a client only upon receiving authorization from a monitoring server to execute the software. When an attempt to execute software on the target server by a client is not authorized, monitoring server notifies the system administrator of the unauthorized attempt.

7 Claims, 9 Drawing Sheets

U.S. PATENT DOCUMENTS

| | | | |
|---|---|---|---|
| 7,017,183 B1 * | 3/2006 | Frey et al. | 726/5 |
| 7,069,325 B1 * | 6/2006 | Lu et al. | 709/226 |
| 7,107,610 B2 * | 9/2006 | Lortz | 726/4 |
| 7,117,243 B2 * | 10/2006 | Peart | 709/203 |
| 7,188,359 B2 * | 3/2007 | Toomey | 726/3 |
| 2002/0019948 A1 * | 2/2002 | Katou et al. | 713/202 |
| 2002/0116206 A1 | 8/2002 | Chatani | |
| 2002/0144124 A1 | 10/2002 | Remer et al. | |
| 2003/0101355 A1 | 5/2003 | Mattsson | |
| 2003/0108018 A1 | 6/2003 | Dujardin et al. | |
| 2003/0149900 A1 * | 8/2003 | Glassman et al. | 713/202 |
| 2003/0177394 A1 | 9/2003 | Dozortsev | |
| 2004/0054928 A1 * | 3/2004 | Hall | 713/201 |

* cited by examiner

METHOD AND DEVICE FOR DETECTING COMPUTER INTRUSION

This application is a continuation-in-part to U.S. application Ser. No. 10/461,932, filed Jun. 13, 2003, entitled "Method and Device for Detecting Computer Network Intrusions". This application claims the benefit of U.S. Provisional Patent Application Ser. No. 60/388,619, filed Jun. 17, 2002, and which is incorporated herein by reference.

BACKGROUND

This invention relates to computer security and particularly to computer intrusion detection whereby access to a target server is monitored.

Computer networks typically include a server computer ("server") and a plurality of client computers ("clients") coupled to permit access by clients to resources on the server. Security of servers on the Internet and other insecure networks is a major concern. Configuration errors and bugs in widely used proprietary and open source software packages allow attackers to enter and gain control of servers. The attackers can then steal proprietary information, destroy the information, or even destroy the file system of the server, rendering it useless. Even worse, attackers can surreptitiously alter the server's system so that they have ongoing control over it. Once an attacker has established ongoing control over a server's system, they can use it to capture sensitive information or to attack other machines on the network. If the attacker's intrusions go undetected, the damage potential is virtually unlimited. Thus, it is desirable to detect intrusions in a timely manner. Preferably such intrusions should be prevented.

Some previous approaches to detecting network intrusion by an attacker have attempted to detect changes in the running system's file system or behavior. For example, the open source Tripwire system computes a hash of the contents of specified system files and stores the hashes of the system files in a database. Then, periodically or on command, the Tripwire system computes the hash values of the files and compares these recomputed values to the database values. If a difference is found, it implies a change to the system files. Assuming no authorized changes have occurred to the system files, changed hash values indicate an intrusion has occurred. Other intrusion detection tools try to discover file system changes by inspecting file modification dates.

The above described intrusion detection systems are vulnerable to defeat by an attacker because the information that is used to infer changes is stored locally on the compromised system. Thus, the attacker can alter the stored information to defeat the detection technique. For example, a common technique used by attackers to avoid intrusion detection is to install a "root kit." The root kit includes an altered set of commands (such as a directory listing command that fails to display the correct alteration dates of system command files) that mask the actions of the attacker while allowing the attacker unfettered access to the server.

Another common intrusion detection approach attempts to detect abnormal network traffic patterns emanating from the server. While this can work if the normal traffic patterns are well enough defined and different from the traffic pattern an attacker may wish to exploit, these are stringent conditions and do not apply in many cases. In particular, a prudent attacker can generate traffic patterns into which the malicious traffic is then embedded as a small "noise" signal. Finally, these are unlikely to counter the problem of the attacker stealing or destroying the sensitive information on the server itself.

The disclosed method for computer network intrusion detection is implemented on a computer network including a target server, a client on the network and a monitoring server coupled to the target server. The target server is accessible by a client on the network and administered by a system administrator capable of authorizing attempts to execute software on the target server. The method comprising the steps of loading monitored latent software on the target server and monitoring. Attempts to execute monitored latent software on the target server from the client are received and it is determined whether the attempt to execute the monitored latent software by the client is authorized prior to completely executing the monitored latent software. A message is sent to the system administrator and the execution of the monitored latent software is aborted prior to completion when the attempt to execute the monitored latent software is not authorized.

Another disclosed method for computer network intrusion detection is implemented on a computer network including a target server and a monitoring server. The target server is accessible by a plurality of clients on the network and administered by a system administrator capable of authorizing attempts by a client on the network to execute software on the target server. The method includes distinguishing between active software and latent software resident on the target server and permitting attempts to execute active software on the target server by any of the plurality of clients. A client of the plurality of clients is authorized to attempt to execute latent software on the target server thereby defining an authorized client. Attempts to execute latent software on the target server are received from a client of the plurality of clients thereby defining an attempting client. It is determined whether the attempting client is the authorized client prior to completely executing the latent software on the target server. When the attempting client is not the authorized client, a message is sent to the system administrator and execution of the monitored latent software is aborted prior to completion.

A disclosed computer system administered by a system administrator and accessible by a client on an external network includes a target server coupled to the external network and configured to receive connections from the client and to receive requests from the client to execute software thereon, an interface with the system administrator and a monitoring server coupled to the target server but not directly accessible on the external network by the client. The monitoring server has authorization data resident thereon and administration software accessible through the interface for administering the authorization data. The said target server includes software resident thereon having an authorization subroutine for sending a query to the monitoring server indicating that the client is requesting to execute the software and receiving a response from the monitoring server indicating that the client is authorized to execute the software prior to successfully completing execution of the software for the client. The monitoring server includes a subroutine thereon for receiving the query from the target machine, accessing the authorization data to determine whether the client is authorized to execute the software on the target machine, sending a response to the target machine indicating that the client is authorized to execute the software or the client is not authorized to execute the software, and sending a message through the interface to the system administrator if the client is not authorized to execute the software.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying drawings in which.

DETAILED DESCRIPTION OF THE DRAWINGS

Figure 1:
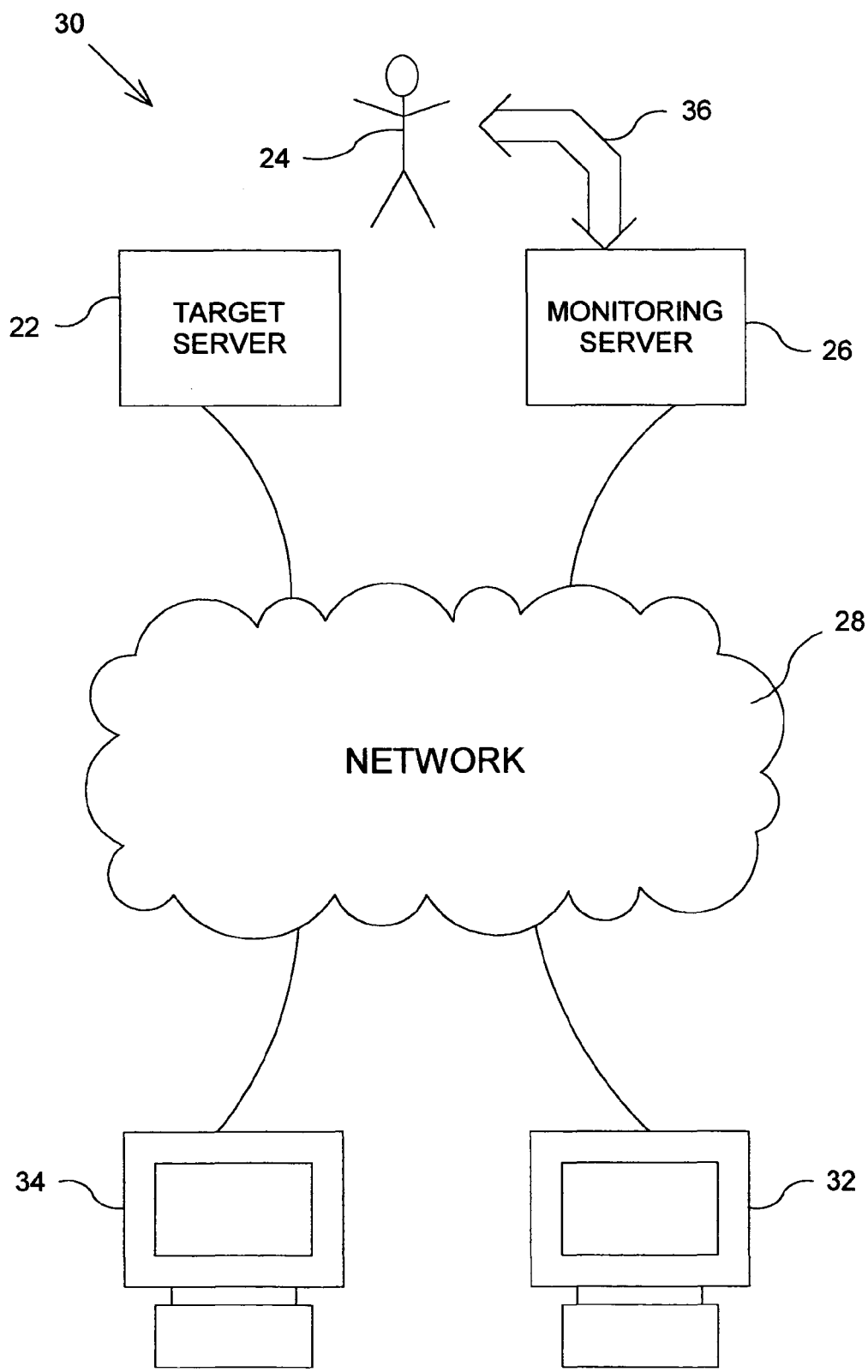
FIG. 1 is a simplified computer network layout diagram including a target server, a monitoring server coupled through an interface with a system administrator and two clients one of which is an attacker client and one of which is an authorized client.

As shown, for example, in FIGS. 1-4, the disclosed method 20 of detection of server intrusion provides that an intruder first execute software resident on an attacked machine or target server 22 that was loaded by a legitimate administrator 24 of target server 22. This software on target server 22 may check with a "home base", shown illustratively as a monitoring server 26, prior to each execution to see if it should proceed. Alternatively, as shown, for example, in FIGS. 6 and 8, the software on target server 22 may check with monitoring server 26 for authorization to proceed whenever a time interval has not expired. If the intruder can never successfully execute the first command, then information on target server 22 cannot be read, altered, or destroyed. Without reading or altering information on target server 22, the attacker cannot install malicious software versions on target server 22. Thus, the attack fails.

Network servers typically include a well defined set of software accessible by network clients that is designed to be running on the server at a typical instant. Often such a server computer is designed to operate autonomously, carrying out a few well-known tasks, such as web service, electronic mail service, printer service and file service. This well-known task software is referred to herein as the "active" software. Other software on the server, such as an administration command or a secure remote login daemon is not intended to be used during normal operation. This second class of software is referred to herein as the "latent" software.

Software can be further classified by how it is activated or used. A "command" is a software component that is executed by a user from some interface, typically via a "command shell" such as DOS or UNIX, accessed either locally from the machine's console or remotely through a remote login service. Typically, as shown, for example, in FIG. 7, a command is executed and runs to completion once invoked, returning a result to the user through the interface. A daemon, on the other hand, is a persistently running program that is started, typically at boot time, and runs continuously, servicing individual requests or reacting to events or conditions, as shown, for example, in FIG. 5. An example is the secure shell daemon, which waits for network connections on TCP port 22 and authenticates logins. Once the login is authenticated, the user is connected to a command shell, in which he or she may the activate commands. Other examples include web servers, mail servers, and file transfer protocol (FTP) servers. Note that active software components will typically be daemons, though not necessarily. Latent software components will typically be either daemons (e.g. secure remote login daemon, file transfer protocol daemon) or commands (e.g. directory listing command, file copying command).

Referring to FIG. 1, a simplified computer network layout 30 is shown. The illustrated simplified computer network 30 includes target server 22, monitoring server 26, two clients 32, 34 and an interface 36 with an administrator 24. Monitoring server 26 is coupled through interface 36 with system administrator 24. Interface 36 may include any standard computer interface such as a separate administrator computer coupled directly or through the network to the monitoring server 26 or phone, pager, fax, PDA or other device coupled directly or through a network gateway to monitoring server 26. One illustrated client 32 is an attacker machine and one illustrated client 34 is an authorized maintenance person's machine. Those skilled in the art will recognize that the illustrated servers 22, 26 and clients 32, 34 communicate over a network 28 which may include additional non-illustrated servers and clients. While the target and monitoring servers 22, 26 are shown as separate machines, it is within the scope of the disclosure for the target and monitoring servers 22, 26 to be implemented on a single computer, on separate processors or on separate virtual machines.

Figure 2:
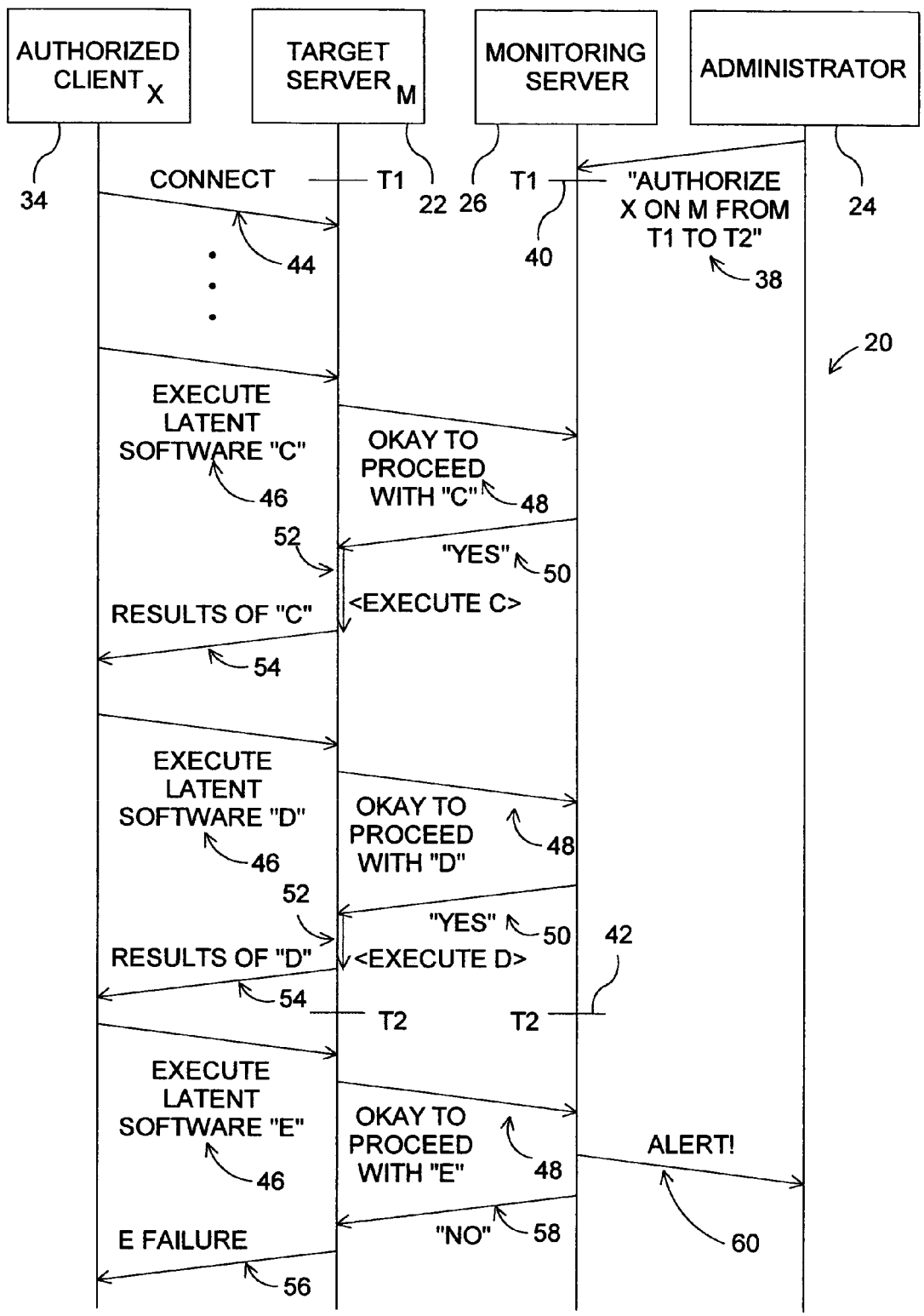
FIG. 2 is a timing diagram of a pre-authorized access to the target server wherein the administrator has created authorization on the monitoring server permitting access to latent software commands on the target server by the authorized client during a defined interval, showing authorized client twice invoking a latent software command on target server during the defined interval and once invoking latent software outside of the defined interval.

FIG. 2 is a timing diagram of an attempt to execute latent software on target server 22 by an authorized client 34. In the illustrated embodiment, administrator 24 has created authorization 38 on monitoring server 26 permitting access to latent software on target server 22 ("M") by authorized client 34 ("X") during a defined interval, i.e. administrator 24 has authorized access to latent software on target server 22 by authorized client 34 between time $t_1$ 40 and time $t_2$ 42. Illustratively, this authorization 38 is entered by administrator 24 prior to time $t_1$ 40.

As shown in FIG. 2, authorized client 34 connects 44 to target server 22 and attempts to execute latent software 46 resident on target server 22. While only inferentially illustrated by the ellipses in FIG. 2, it is within the scope of the disclosure for authorized client 34 to execute active software 74 on target server 22 between connection 44 and the attempt to execute latent software 46. Illustratively, during this first attempt to execute latent software on target server 22, authorized client 34 invokes latent software "C". Upon attempting to execute the latent software 46 on target machine 22, the altered or monitored latent software 302, 502 (FIGS. 4, 6 and 8) on target server 22 queries 48 monitoring server 26 to receive authorization to execute the latent software. The latent software on target server 22 suspends operation until a response is received from monitoring server 26. Because monitoring server 26 has been programmed to provide authorization 38 to authorized client 34 if a request to execute latent software 46 is received in the defined interval from authorized client 34, monitoring server 26 sends a "yes" authorization response 50 to target server 22 indicating that it may proceed with execution of the latent software. Upon receipt of the authorizing response from monitoring server 26, target server 22 completes execution 52 of the latent software "C" and sends the results 54 of the latent software "C" to authorized client 34.

Illustratively, during a second attempt to execute latent software 46 on target server 22, authorized client 34 invokes latent software "D". Since the invocation of latent software "D" 46 is received from authorized client 34 prior to time $t_2$ 42, the above described authorization process is repeated and authorized client 34 receives the results 54 of the latent software "D" execution.

However, if authorized client 34 invokes latent software on target server 22 prior to time $t_1$ (not shown) or after time $t_2$, i.e. outside the defined interval, monitoring server 26 will send a "no" response 58 to the authorization query 48 and target server 22 will abort execution of the latent software before completion. An appropriate failure message 56 is sent to authorized server 34. It is within the scope of the disclosure to not notify the client when authorization has been denied. Also, upon receipt of an authorization query 48 outside of the defined interval, monitoring server 26 sends an alert message 60 to administrator 24. It is within the scope of the disclosure for authorization software on monitoring server 26 to send a query to administrator 24 each time an authorization query 48 is received from target server 22 and await a response from administrator 24 prior to sending a "yes" or "no" response to target server 22.

Figure 3:
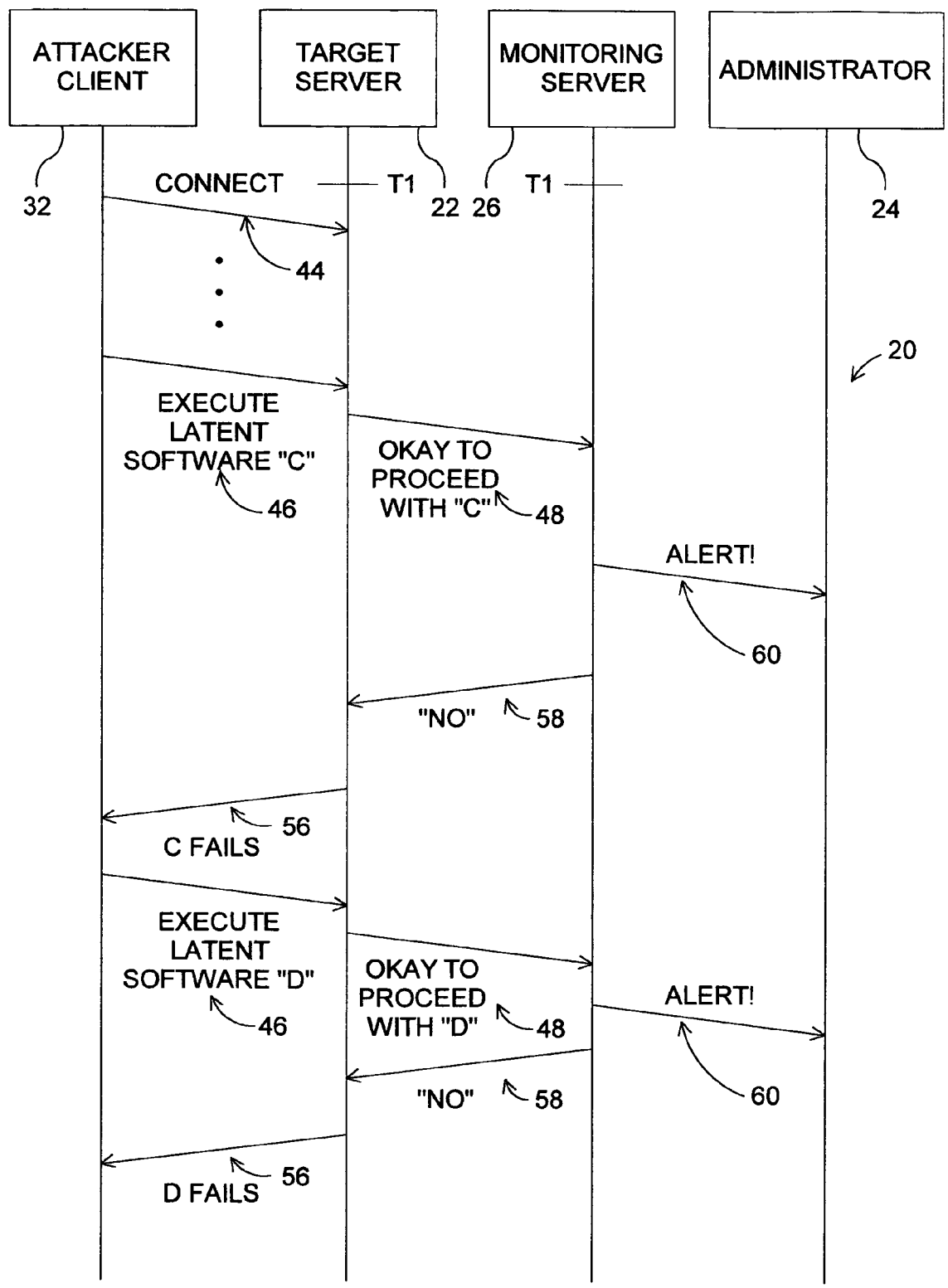
FIG. 3 is a timing diagram of an unauthorized access to a target server wherein an attacker twice attempts to invoke latent software on the target server, showing the target server querying the monitoring server to receive authorization to execute the latent software, the monitoring server alerting the administrator of the unauthorized access attempt and denying access to the latent software and the target server failing to successfully complete execution of the latent software.

FIG. 3 is a timing diagram of unauthorized attempts to access latent software on target server 22. In the illustrated embodiment, administrator 24 has not created authorization on monitoring server 26 permitting access to latent software on target server 22 by attacker client 32. As shown in FIG. 3, attacker client 32 connects 44 to target server 22 and attempts to execute 46 latent software resident on target server 22. While only inferentially illustrated by, the ellipses in FIG. 3, it is within the scope of the disclosure for attacker client 32 to execute active software 74 on target server 22 between connection 44 and the attempt to execute latent software 46. During this first illustrated attempt to execute 46 latent software on target server 22, attacker client 32 attempts to execute latent software "C". Upon attempting to execute 46 the latent software on target server 22, the altered latent software on target server 22 queries 48 monitoring server 26 requesting authorization to execute the latent software. The latent software on target server 22 suspends operation until a reply is received from monitoring server 26. In the illustrated embodiment, because monitoring server 26 has not been programmed to provide authorization to attacker client 32, monitoring server 26 sends a "no" response 58 to target server 22 indicating that it may not proceed with execution of the latent software. Additionally, since an unauthorized request to execute latent software on target server 22 has been received, monitoring server 26 sends an alert message 60 to administrator 24 indicating a possible intrusion has been attempted. Upon receipt of the "no" response 58 from monitoring server 26, target server 22 aborts execution of the latent software and sends a failure message 56 to attacker client 32 indicating that latent software "C" failed to complete execution. It is within the scope of the disclosure to not notify the client when authorization has been denied. FIG. 3 also illustrates a second attempt to execute latent software 46 "D" which again results in failure of execution.

As shown, for example, in FIGS. 1-4, in the described method 20 and device 30, latent software 302, 502 is running on target server 22 that queries monitoring server 26 prior to executing its normal function. Monitoring server 26 may respond by indicating that target server 22 is authorized to proceed or is not authorized to proceed with its normal function. If this response indicates to proceed ("yes") 50, as shown in FIG. 2, then the normal function of the latent software is carried out by target server 22 and the results are sent 54 to the client. Otherwise, the target server 22 aborts execution of latent software 302, 502 prior to carrying out the normal function and sends a failure message 56 to the client. It is within the scope of the disclosure to not notify the client when authorization has been denied. Illustratively, at any time after connection 44 any client may freely execute active software 74 resident on target server 22, 122. So long as the active software 74 does not call monitored latent software, active software 74 runs to completion.

In the illustrated embodiment of FIGS. 2 and 3, the latent software running on target server 22 includes a wait period which specifies a time limit for receipt of a response from monitoring server 26. If the response is not received within a specified time limit, it is treated as a negative response and execution of the latent software is aborted. This prevents attackers from interdicting the method 20 by a network denial of service attack. However, it is also within the scope of the disclosure for the latent software execution on target server 22 to be suspended indefinitely until a response is received from monitoring server 26. Additional features, such as those found in FIGS. 6 and 8 may be incorporated into method 20 within the scope of the disclosure.

Figure 4:
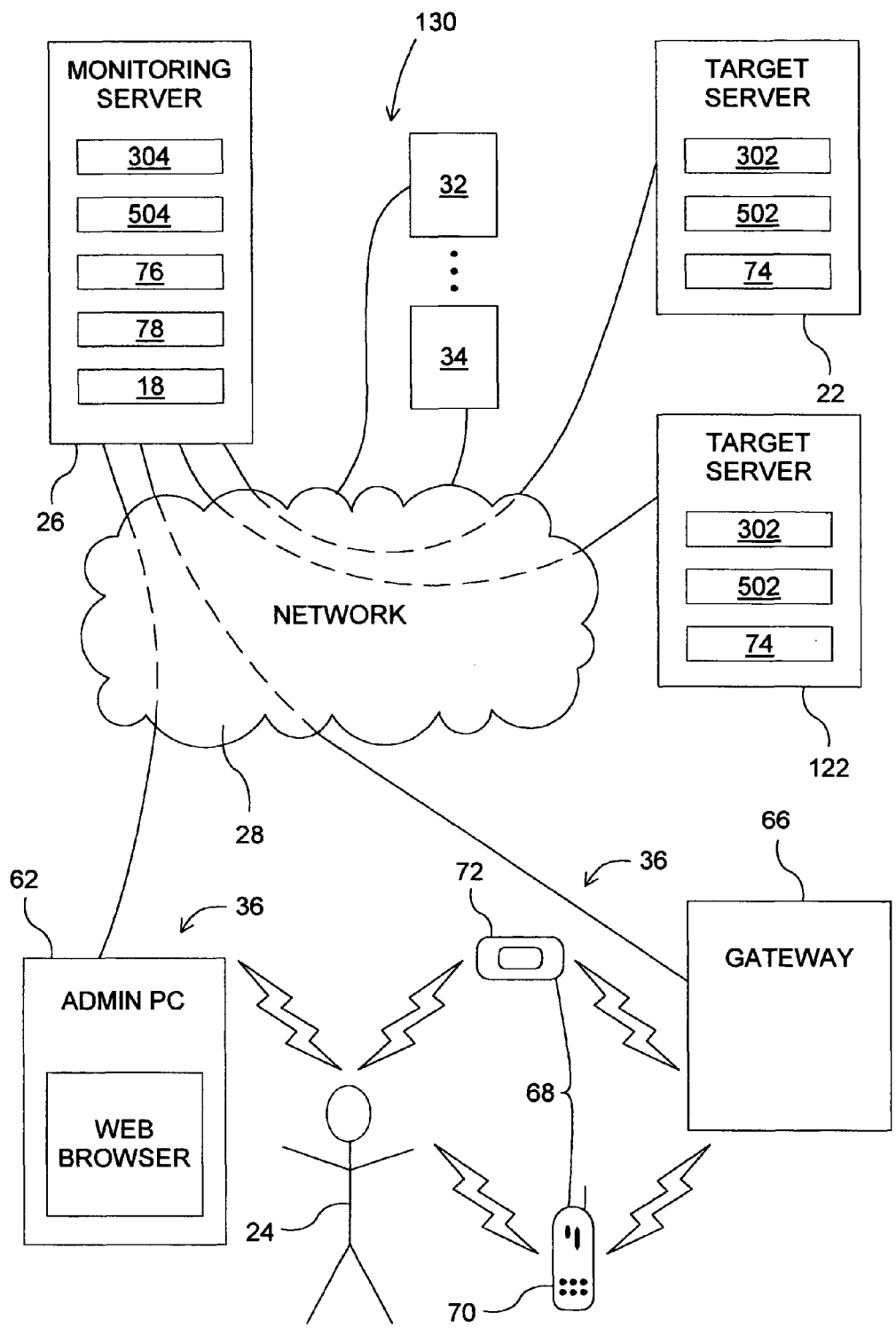
FIG. 4 is a network system layout diagram showing a plurality of target servers coupled to a network through which clients (not shown) can access resources on the target servers, a monitoring server and an administrator capable of interfacing with the monitoring server via an administrator PC or a phone or pager through a phone/pager gateway.

FIG. 4 discloses a more detailed network layout 130 wherein a single monitoring server 26 services multiple target servers 22, 122. In network layout 130, an administrator's PC 62 runs a web browser 64 interfacing with administration software 18 on monitoring server 26. E-mail notification of administrator 24 on administrator PC 62 of unauthorized attempts to access latent software on target server 22, 122 is within the scope of the disclosure. A gateway 66 on network 28 is coupled to messaging devices 68, such as a phone 70 or a pager 72, for notification of administrator 24 of unauthorized attempts to execute latent software on target server 22, 122. Thus, the connections between monitoring server 26 and the administrator's PC 62 and gateway 66 are considered interfaces 36.

A plurality of client including attacker client 32 and authorized client 34 are on the network 28 and may connect through the network to target servers 22, 122. Clients 32, 34 are restricted from directly connecting to monitoring server 26.

As shown, for example, in FIG. 4, administrative software 18, portions 304, 504 of monitored latent software 300, 500, request log 76, and permission database 78 are resident on monitoring server 26. Portions 302, 502 of monitored latent software 300, 500 and active software 74 are resident on target servers 22, 122. The term "resident on" and similar terms means that a program or function is stored on a computer readable medium. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory, such as main memory. Transmission media includes coaxial cables, copper wire and fiber optics, including the wires that comprise bus 102. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave on a transmission media, or any other medium from which a computer can read.

Administrative web program 18 is used to manage permissions database 78 on monitoring server 26. Monitoring server 26 maintains a database of permission information 78. This information governs the access policy for the monitored servers. Essentially, it records under what circumstances (time, command name, host) a command (or daemon) may be executed. For example, it might say 'From 1800-1900 hours host foobar.x.com may execute any command', 'Host frobboz.y.com may not execute any commands.', etc.

Permission database 78 is illustratively maintained by authorized administrator 24 via a web-based application. The web-based application resident on the administrator's PC 62 allows authenticated and private access by a controlling administrator 24, with controls allowing granting or denying permissions at particular time ranges, on particular hosts. One embodiment of the web-based application is the Apache web server (www.apache.org) using Java servlet technology. The web-based application might also have controls for arranging for logging of permission requests, notification via phone, email, or pager when unauthorized permission requests are received. This web-based application may be implemented using techniques well known to web implementers skilled in the art. It is within the scope of the disclosure for more detailed options to vary the basic scheme. For example, the permissions could further depend upon the identity of the person accessing the monitored server, based upon a special authentication command available on the monitored server.

Figure 5:
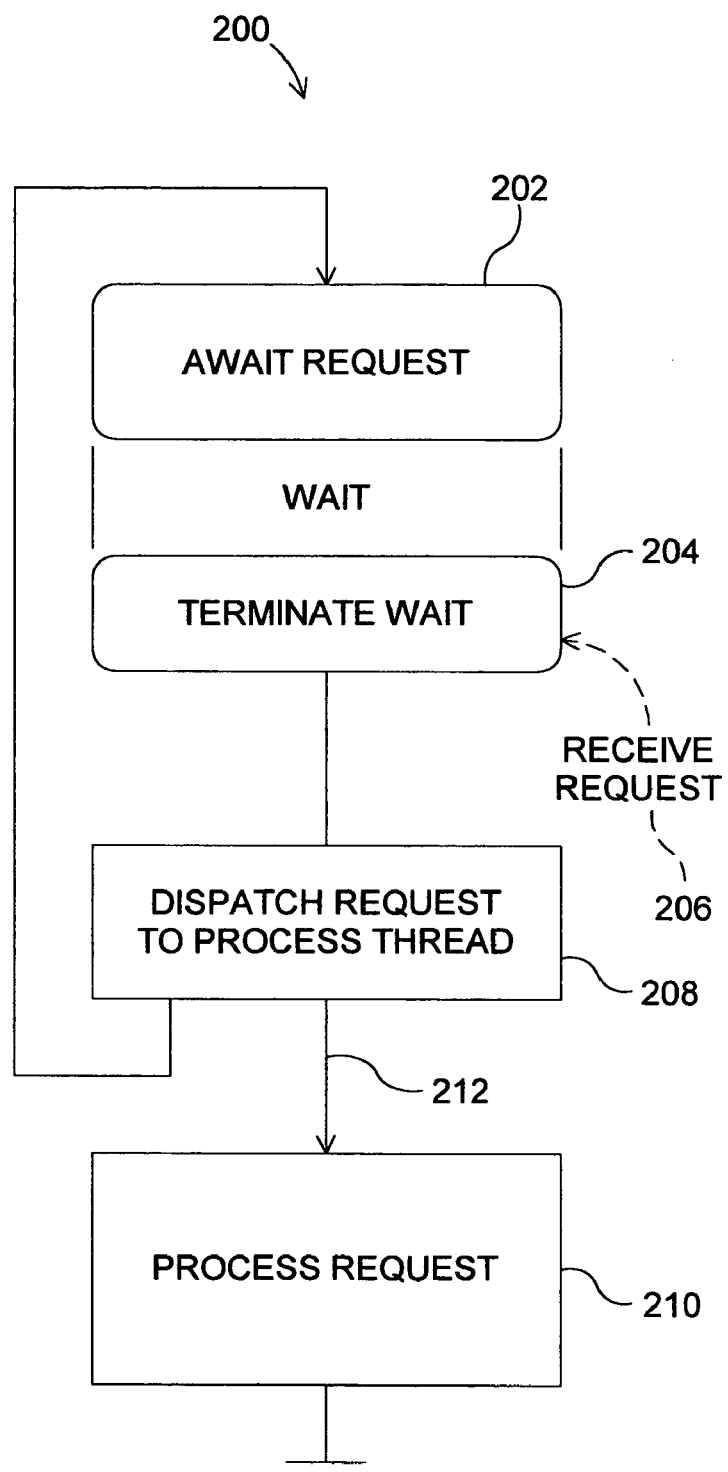
FIG. 5 is a simplified flow diagram of a typical prior art daemon that would be running on a server showing the daemon awaiting a request and dispatching the request to a process thread for servicing upon receipt of the request.
Figure 6:
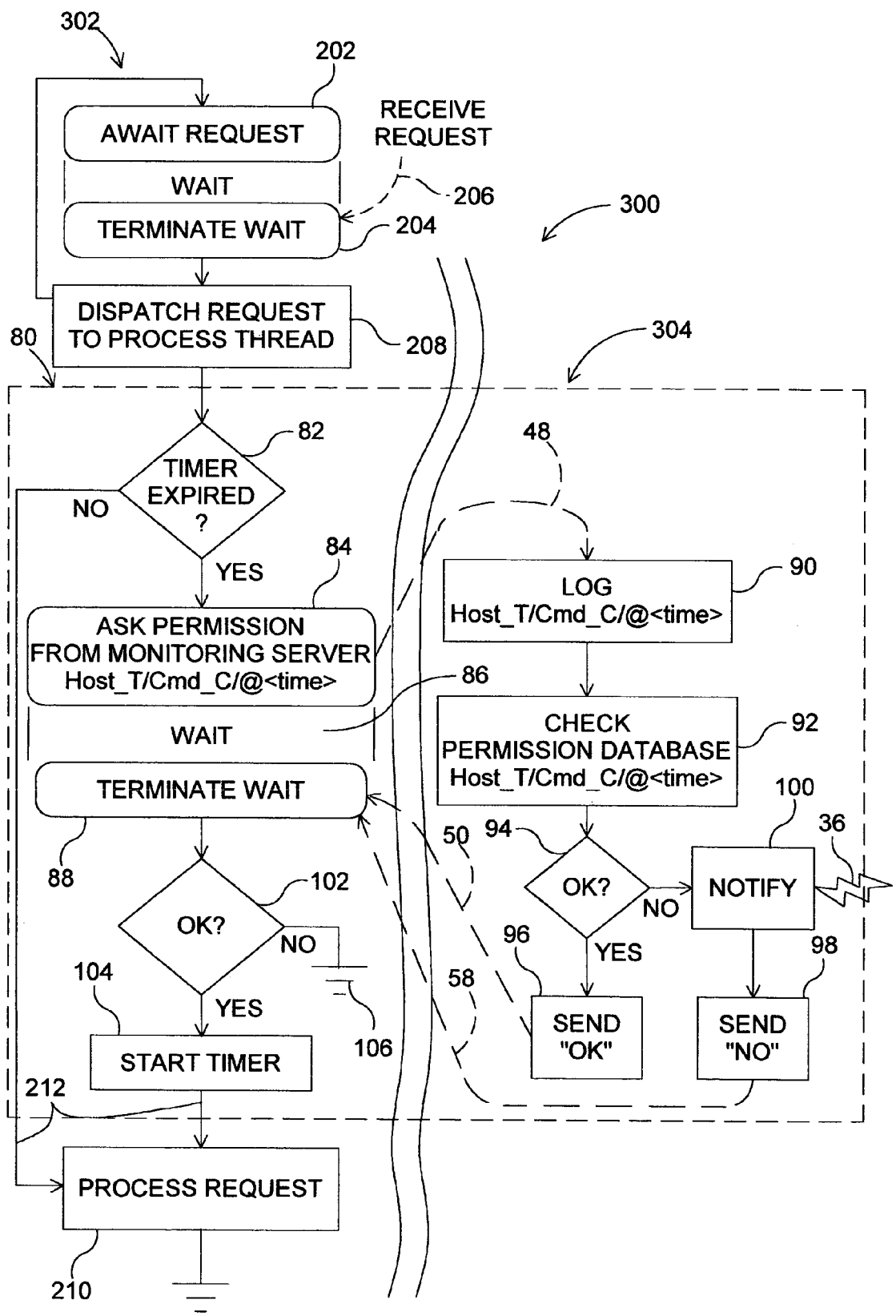
FIG. 6 is a simplified flow diagram of monitored daemon showing a first component of the daemon on a target server awaiting a request and a second component of the daemon running on a monitoring server, the monitored daemon implements a query and response between the target and monitoring servers through signed and encrypted messaging, processes the request only upon receipt of an initial authorization and continues to process requests from the same user so long as a time interval has not expired after an initial authorization is received.
Figure 7:
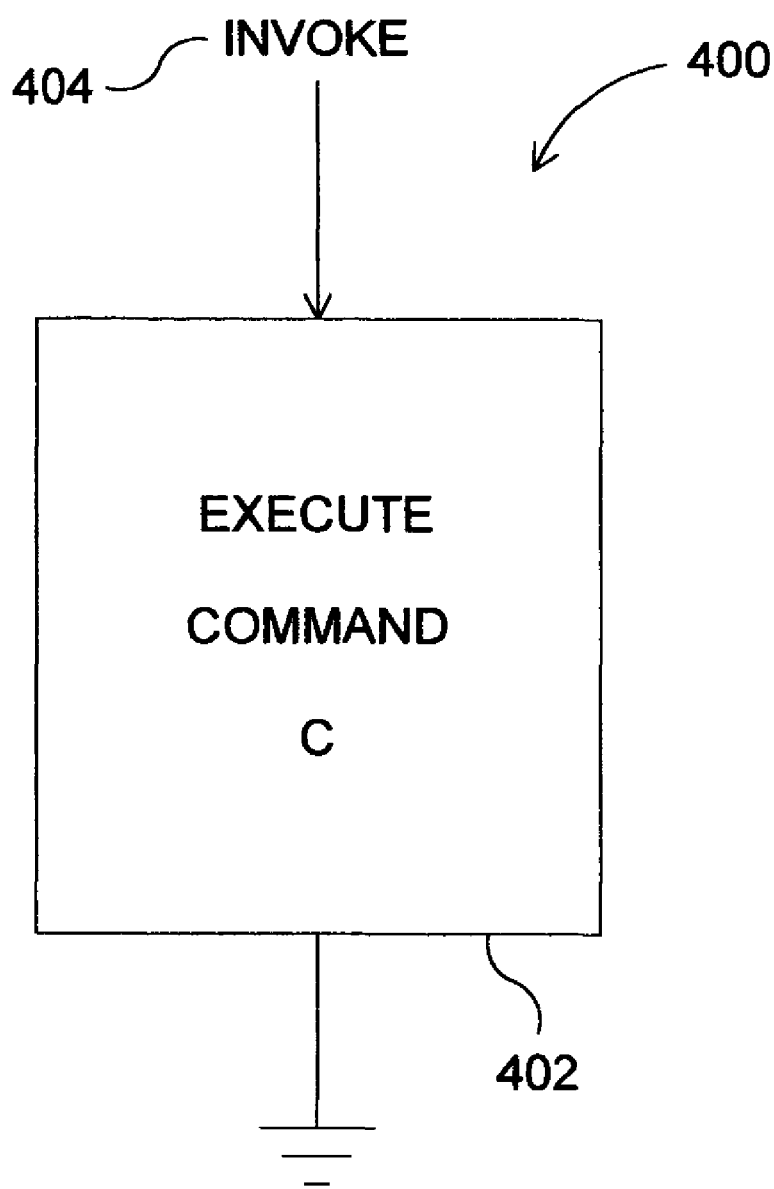
FIG. 7 is a simplified flow diagram of a typical prior art command wherein an invoked command on a server system is immediately executed.
Figure 8:
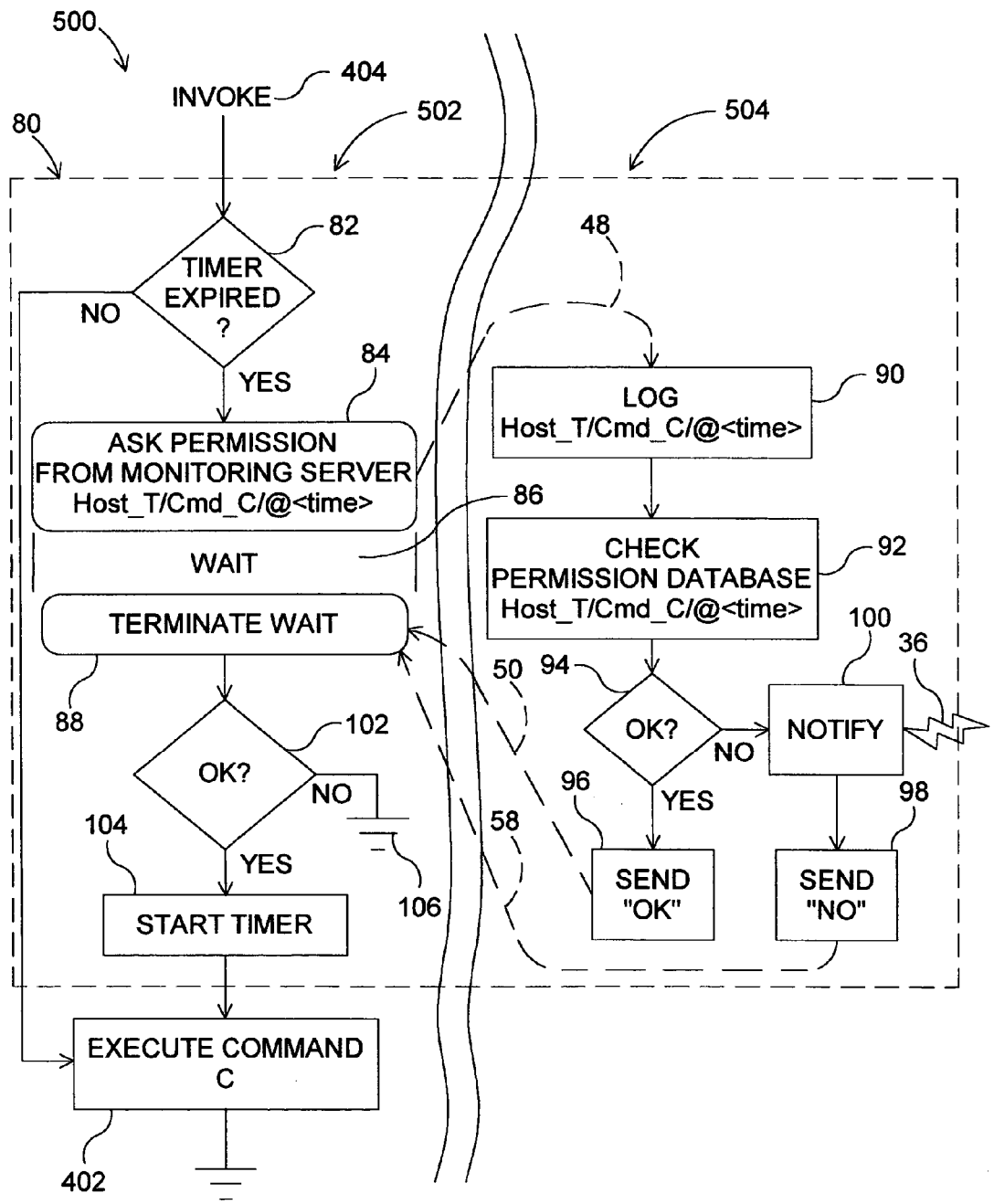
FIG. 8 is a simplified flow diagram of monitored command showing a first component of the command stored in a standard location on the target server system file structure that implements a signed and encrypted query to a monitoring server and awaits authorization before initial execution of a command by the user and then continues to execute commands from the same user without further authorization so long as a time interval has not expired after an initial authorization is received.
Figure 10:
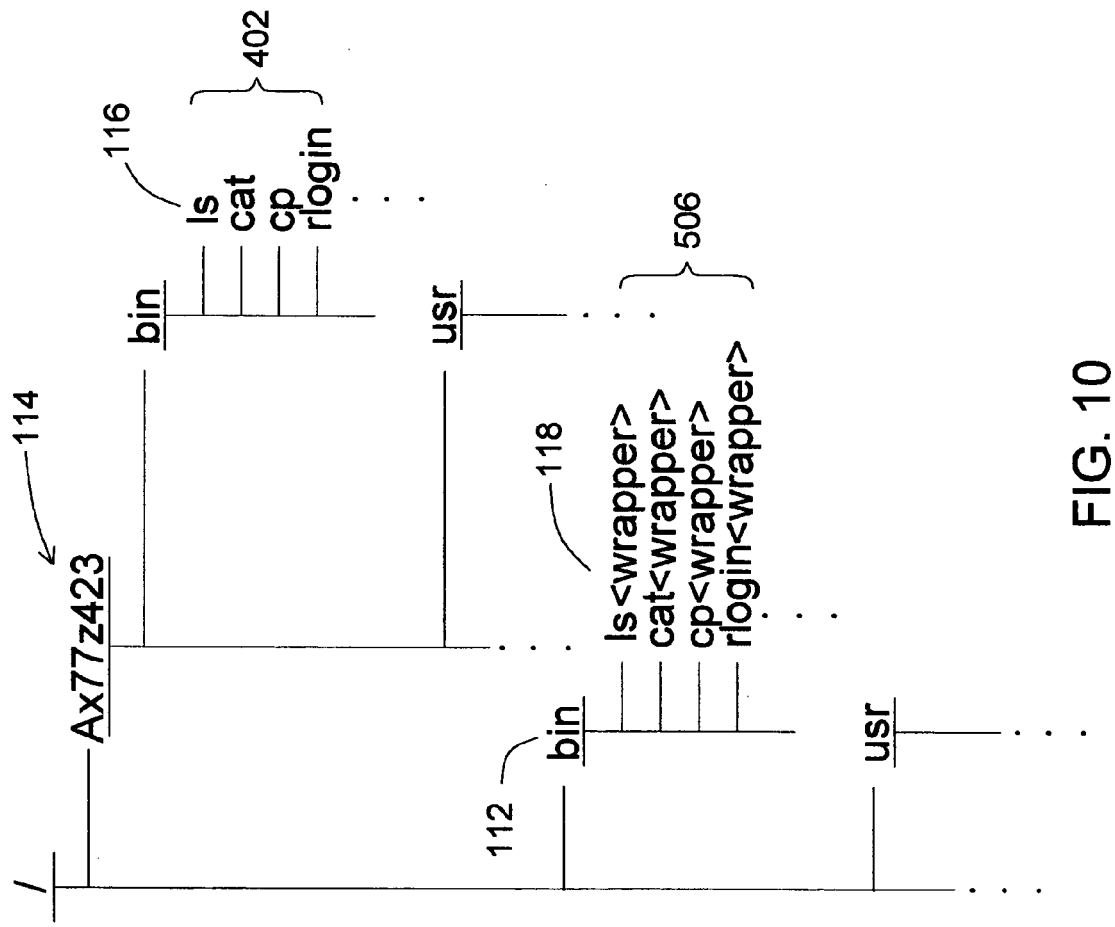
FIG. 10 is a diagram of a modified file system on a target server wherein wrapper functions are stored in the standard well known location in a file system and commands are stored at a hidden location in the file system.

FIGS. 4-10 illustrate alteration of the installed software on the target server to implement remote notification of a possible network intrusion and authorization of access to latent software. FIGS. 5 and 6 show before and after flowcharts for daemon operation on target server 22. FIG. 5 is the unaltered daemon process 200 on a server. FIG. 6 is an altered daemon process 300 including a target server component 302 resident on target server 22 and a monitoring server component 304 resident on monitoring server 26. FIGS. 7 and 8 show before and after flowcharts for command invocation on target server 22. FIG. 7 shows the unaltered command invocation 400. FIG. 8 shows the altered or monitored command invocation 500 including a target server component 502 resident on target server 22 and a monitoring computer component 504 resident on monitoring computer 26. In FIGS. 5-8, dashed arrows represent network communication messages. The interface 36 with system administrator 24 for purposes of sending notification messages is represented by a lightning bolt 36 in FIGS. 6 and 8. Those skilled in the art will recognize that both the altered daemon 300 and altered command 500 include an authorization and notification algorithm 80 inserted into, and nested within, the algorithm of the unaltered daemon and command invocation algorithm, respectively, that interrupts the latent software prior to completion of execution of the of the latent software function if access is unauthorized.

As shown, for example, in FIGS. 6 and 8, upon interrupting execution of the daemon or command, authorization and notification algorithm 80 checks to determine if a timer has expired 82. This timer is set upon receipt of an initial authorization to execute latent software. If the timer has not expired, the interruption of the daemon or command ceases and the latent software continues to completion. If the timer has expired, or has never been set, target server 22 asks the monitoring server for permission 84 to continue execution of the latent software by sending a query 48. It is within the scope of the disclosure that a timer can be implemented in many ways, including implementing a timer that counts up or down using the system clock or creating a file indicating either the end time of a time interval or the start time and duration of a time interval and comparing the current time to the data in the file. After sending query 48 the process on target server 22 is interrupted for a wait period 86 during which time the process awaits a response 88 from monitoring server 26.

Illustratively, query 48 includes information that is entered into a log 90 on monitoring server 26. This information is then used to check a permissions database 92. The monitoring server 26 then determines if the data in the permissions database indicates that access to the latent software is authorized 94. If so, monitoring server 26 prepares an "OK" message 96 and sends an "OK" authorization response 50 to the process on target server 22. If the data in the permissions database indicates that access to the latent software is not authorized, monitoring computer 26 notifies 100 the system administrator 24 of an unauthorized attempt to execute latent software on target server 22 and prepares 98 and sends a "No" response 58 to the process on target server 22.

Upon receipt of a response 50, 58 from monitoring server 26, or upon expiration of the wait period, the process on target server 22 continues and determines if an "OK" authorization response was received 102. If so, the timer is started 104 and execution of the latent software is allowed to continue to completion. If a "no" response was received from the monitoring computer 26, or the wait period expired prior to receiving a response, the latent software aborts execution 106.

Daemons are a first type of latent software on target server 22 that are altered to include authorization and notification algorithm 80. As shown for example, in FIG. 5, an unaltered daemon 200 runs on a server awaiting a service request 202. Daemon 200, while waiting for a service request, queries a port on which a service request message 206 might be received. When a request is received, illustratively via network messaging 206 from a client 32, 34, daemon 200 terminates the wait period 204 then dispatches the request to a process thread 208. Once the process thread is dispatched 212, daemon 200 then again begins awaiting a service request 202 while the process thread is executed 210.

To protect a daemon so as to implement a monitored daemon 300, it is necessary to alter the daemons code to call the secure query/response software 80 prior to servicing a request 210, as shown, for example, in FIG. 6. The illustrated altered or monitored daemon 300, includes each of the components, processes and functions of unaltered daemon 200 with query/response software 80 inserted between the dispatch request to process thread step 208 and the processing of the request by the thread step 210. Illustratively, the query/response algorithm 80 is nested within the unaltered latent software. For open source software, such as exists under the GNU/Linux operating system, this is easily accomplished using standard programming techniques. For proprietary software, it is possible either to negotiate with the vendor/owner of the software to put in the necessary "hooks" (modifications), use existing Application Programming Interfaces (APIs) to carry out the necessary calls, or reverse engineer the object code and patch it to make the calls. All these techniques are well known in the art.

Commands 400 are a second type of latent software on target server 22 that are altered to include authorization and notification algorithm 80. An unaltered command 400 is immediately executed 402 once an invocation call 404 is received. As shown in FIGS. 7-10, for commands executed from the command line, a "wrapper" script 506 can be written that replaces the original command 400 to implement authorization and notification algorithm 80. Wrapper 506 first calls the secure query/response protocol software 80. If this call returns success, then wrapper 506 will execute the normal command 402, which will be hidden in a non-standard location 110, as shown, for example, in FIG. 10.

Figure 9:
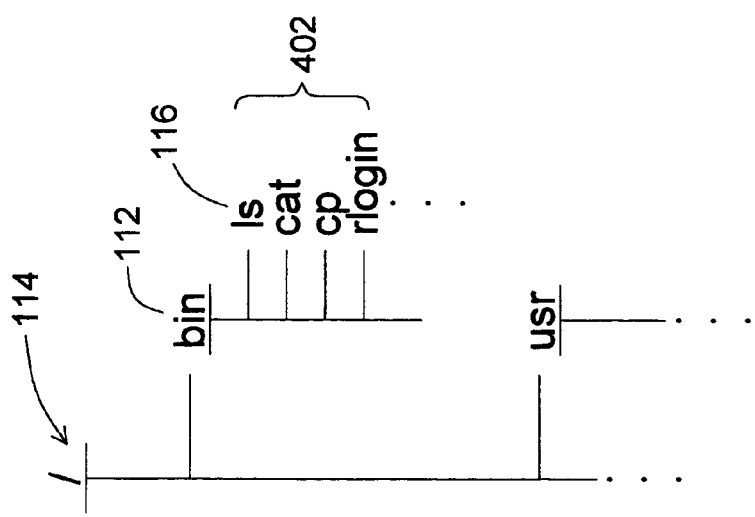
FIG. 9 is a diagram of a normal prior art file system on a server wherein commands are stored in a standard well known location in a file system and are executed immediately upon invocation of a command specifying this well known location.

Under Linux, the "ls" command is typically stored in a well-known standard location 112 on the file system 114, such as ("/bin/ls") as shown, for example, in FIG. 9. During the implementation of a monitored command 500 the original "ls" command 116 is moved from its standard location ("/bin/ls") 112 to the hidden location (/Ax77z423/bin/ls") 110, as shown, for example, in FIG. 10, and thus becomes a "hidden command". The wrapper for "ls", ls<wrapper> 118 is then installed in "/bin/ls" with a call to the hidden command "ls" 116 that is installed in "/Ax77z423/bin/ls" of file system 114. The hiding is successful, because the attacker has no way of practically guessing the pathname to locate the original commands 402. All directory listing commands will be wrapped, so an attacker cannot execute such a listing without causing a notification, which will then detect and prevent further intrusion. Other approaches for implementing monitored commands, e.g. altering the source code of the latent commands to implement a query and wait for a response 80 and recompiling code, are within the scope of the disclosure.

Since the disclosed intrusion detection method protects only the latent software 300, 500 portions 302, 304 of which are on target server 22, an attack based solely on executing active software 74 on target server 22 will initially appear to evade the technique. However, most attacks, while possibly exploiting weaknesses in active software 74 to initiate, require the use of latent software 300, 500 to obtain useful (to the attacker) results. A typical scenario is for an attacker to use a buffer overflow in a web server to obtain a root command shell. However, the attacker, even after obtaining the root command shell cannot do anything useful without executing latent commands 300, 500, such as file transfer, directory listing, or file contents display.

In the embodiments of latent software 300, 500 illustrated in FIGS. 6 and 8, target server 22 makes a secure remote query 48 to monitoring server 26 and monitoring server 26 sends an appropriate secure response 50 or 58 to target server 22. Illustratively, the query and response are both signed and encrypted. It is within the scope of the disclosure to modify the method illustrated in FIGS. 2 and 3 to include secure queries and responses.

Of course there are many variations to method 20 shown in FIGS. 2-3 that are within the scope of the disclosure. First, for practicality, if a remote check succeeds, method 20 may choose to set a timer, as shown, for example, in FIGS. 6 and 8. Prior to timer expiration, all latent software 300, 500 then proceeds normally without doing the remote check. This makes for much more practical usage when an authorizing administrator logs in to carry out authorized maintenance, for example.

In another variation of method 20, monitoring server 26 can have a log database 76 for logging all queries 48 it receives as shown, for example, in FIGS. 6 and 8.

As shown, for example, in FIGS. 6 and 8, the query 48 sent by target server 22 includes some information about the circumstances of the call. This information is compared to information stored in permissions database 78 on monitoring server 26 to determine whether authorization should be sent to target server 22.

The secure queries 48 and responses 50, 58 illustrated in FIGS. 6 and 8 are implemented using cryptographic digitally signed network messages, for example using the RSA or DSA public key signature techniques. The protocol for communication can be via a well known query/response protocol, such as HTTP, a messaging protocol, such as SMTP, or via simple remote procedure call in a network capable programming language such as Java. Illustratively, the query and response are both encrypted for privacy with well known encryption techniques to maintain the privacy of the communication between target server 22 and monitoring server 26. Such secure query/response protocols are well known in the art.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the present invention has been described in regards to a disclosed operating system, features of the present invention may implemented in other operating systems environment.

What is claimed is:

1. A method for computer intrusion detection on a computer system including a target server accessible by a client and administered by a system administrator capable of authorizing attempts to execute software on the target server, a client and a monitoring server coupled to the target server, the method comprising steps of:

running on the target server a monitored latent software performing a latent software function upon successful completion of authorization by the monitoring server;

creating, via the system administrator, an authorization on the monitoring server prior to an attempt to execute the monitored latent software, wherein the authorization comprises an authorized client and a time interval;

receiving the attempt to execute the monitored latent software on the target server from the client, wherein said client is located remotely from said target server and said monitored latent software is monitored by the monitoring server that is physically separated from the target server and the client;

sending a query from the target server to the monitoring server to receive authorization to execute the monitored latent software;

after sending the query, suspending execution of the monitored latent software until a response is received by the target server from the monitoring server;

determining by the monitoring server whether the client is authorized to execute the monitored latent software by determining that the client is the authorized client and the attempt occurs during the time interval in the authorization; and sending a message to the system administrator indicating detection of an intrusion when the attempt to execute the monitored latent software is not authorized, wherein the monitored latent software includes an implementing subroutine for performing the latent software function and a nested authorization subroutine for determining if the attempt to access the monitored latent software is authorized, wherein the implementing subroutine is resident entirely on the target server and the authorization subroutine includes a portion resident on the target server and a portion resident on the monitoring server.

2. The method of claim 1 wherein the portion of the authorization subroutine on the target server using a query queries the monitoring server and the monitoring server using a response responds to the query during the determination step.

3. The method of claim 2 wherein the query and response are secure.

4. The method of claim 2 including the step of signing the response.

5. The method of claim 2 including the step of signing the query.

6. The method of claim 3 including the step of encrypting the query.

7. The method of claim 2 including the step of signing and encrypting the query and response.

* * * * *